United States Patent [19]
Carlberg

[11] Patent Number: 5,096,424
[45] Date of Patent: Mar. 17, 1992

[54] TRAINING APPARATUS AND METHOD FOR HANDLING NEWBORN INFANTS

[75] Inventor: Gayl Carlberg, Houston, Tex.

[73] Assignee: Chuckles & Co., Houston, Tex.

[21] Appl. No.: 525,456

[22] Filed: May 18, 1990

[51] Int. Cl.$^5$ .............................................. G09K 5/00
[52] U.S. Cl. ................................... 434/262; 446/302; 446/303
[58] Field of Search ............... 434/262, 267, 272, 273, 434/268, 98, 236, 99, 219, 395; 446/295, 296, 472, 272, 302, 100, 321, 337, 295, 175, 16, 369, 371, 382, 385, 376, 298; D21/166–168, 171

[56] References Cited

U.S. PATENT DOCUMENTS

| | | | |
|---|---|---|---|
| D. 310,856 | 9/1990 | Pederson | 434/267 X |
| 3,514,899 | 6/1970 | Bonanno et al. | 446/298 |
| 3,822,486 | 7/1974 | Knapp et al. | 434/273 |
| 3,858,351 | 1/1975 | Porter | 446/296 |
| 3,949,488 | 4/1976 | Welch | 446/302 |
| 4,231,184 | 11/1980 | Corris et al. | 446/175 |
| 4,249,338 | 2/1981 | Wexler | 446/303 |
| 4,439,162 | 3/1984 | Blaine | 434/268 |
| 4,575,351 | 3/1986 | Gonzalez | 446/371 |
| 4,710,145 | 12/1987 | Hall Vandis | 446/100 |
| 4,762,494 | 8/1988 | Woods | 434/236 |
| 4,917,607 | 4/1990 | Van Hoose | 434/236 |

Primary Examiner—Richard J. Apley
Assistant Examiner—Glenn Richman
Attorney, Agent, or Firm—Arnold, White & Durkee

[57] ABSTRACT

A training method for the care and handling or newborn infants, comprising the steps of providing a doll in which the doll comprises a torso, providing a plurality of reference points printed on the surface of the doll at various locations, and providing instructions, such as a manual or video tape, which includes the same reference points as those printed on the surface of the doll.

12 Claims, 4 Drawing Sheets

TRAINING APPARATUS AND METHOD FOR HANDLING NEWBORN INFANTS

BACKGROUND

This invention is directed to a method and apparatus for training expectant parents in the care and handling of a newborn infant. It is well known that expectant parents often experience anxiety about the way to care for and handle their newborn infant, particularly parents who are expecting their first child. Classes, books, and advice by family members are available for communicating the information to the parents. Expectant parents may even handle real babies to gain experience in handling their own. However, these classes, books, and family members often have the disadvantage of that information is communicated solely in verbal fashion, either orally or written. Also, the need for training extends past the birth of the infant. Many mothers, particularly teenage mothers, may not, after the baby is born, recall the advice provided by classes, books, and family members, nor might they have the time, patience, and sophistication needed to diagnose particular problems or crises by carefully reading through the detailed books on infant care written by well-known experts such as Dr. Spock. Furthermore, because the expectant parents lack the proper experience in handling newborns, the handling of a live baby may present certain dangers and safety risks to the baby. Stuffed animals may be used in training classes to simulate the handling of live babies. Also, lifelike training dolls have been proposed for instructing expectant mothers in the handling of their newborns in, e.g., U.S. Pat. No. 4,575,351. However, these stuffed animals and training dolls do not provide means for guiding the parents in the care and handling of the infant. Consequently, there exists an ongoing need for providing expectant parents with both instruction and actual "hands on" experience in handling a baby both before and after the arrival of their own.

SUMMARY OF INVENTION

This invention relates broadly to a method and apparatus for training expectant parents in the care and handling of a newborn infant. The apparatus of the invention comprises a doll, preferably one which simulates a life-sized infant, having a plurality of reference points printed on different body parts and instructions which are organized, indexed, and keyed to the reference points. Preferably, the reference points are colored and/or numbered dots or marks which are easy to quickly find and cross-reference on both the doll and with the instructions. Also, in a preferred embodiment of the invention, the apparatus comprises instructions printed directly on key body parts of the doll, thus providing the parents with instantaneous directions on how to properly care for the child and how to respond to various crises that typically arise with newborn infants. In an advantageous aspect, the invention provides "hands on" experience and an excellent visual aid for the parents in addition to providing readily accessible key information.

The method of the invention comprises the steps of holding a "practice baby" doll in the same manner one would hold an actual infant; reading one or more "reference points" printed on various body parts of the doll; and viewing information, preferably written instructions, on how to care for and/or handle a newborn infant. Thus, the invention provides a method for learning the proper handling of the body and practicing such handling in accordance with the instructions. The method may be practiced in the convenience and privacy of one's own home, and both mother and father may participate in training exercises. Alternatively, the method may be practiced in hospitals by infant-care specialists as a teaching aid for instructing prospective parents in the care and handling of newborns. Furthermore, in certain specific embodiments of the apparatus, because the doll is not only life-like in size but also includes various features such as simulated "spit up" on the mouth, removable hair, and simulated stains in the diaper reflecting an "accident," the invention introduces the parents to the variety of scenarios which they are about to experience in rearing their newborn infant. Furthermore, in a preferred embodiment of the invention, the doll includes written instructions printed on various body parts for aiding the parent in dealing with certain situations which demand immediate attention, such as fevers, the handling by the baby of small objects, and burping the baby.

DETAILED DESCRIPTION AND PREFERRED EMBODIMENT

This invention relates broadly to a method and apparatus for training expectant parents in the care and handling of a newborn infant. In a broad aspect, the invention comprises an apparatus which includes a doll, preferably one which simulates a life-sized infant, having a plurality of reference points printed on different body parts and printed instructions which are indexed and keyed to the reference points. Preferably, the reference points are colored and/or numbered dots or marks. In another broad aspect, the invention comprises a method which includes the steps of holding a "practice body" doll in the same manner one would hold an actual infant, reading a plurality of "reference points" printed on various body parts of the doll, and viewing information such as instructions on how to care for and/or handle a newborn infant.

The term "trainee" as used herein refers to the individual who is using the invention as part of a training program to learn how to care for and handle a newborn infant. Although the trainee is preferably an expectant parent, it may also be any individual who is interested in learning how to handle and care for newborn infants. The term "doll" is used herein in its broadest sense, and includes both human and non-human figures. For example, a doll simulating a newborn infant may be either a likeness of a human baby or an animal such as a bear or chimpanzee.

A preferred embodiment of the method of this invention is directed to a "hands on" training method. This method may involve a programmed sequence of steps which communicates instructions to the parents in an organized fashion. The instructions and doll may be used together by the trainee, who may refer to the instructions with reference to a particular body part of the doll. The instructions are keyed to body parts of the doll so that the trainee can cross-reference the instructions with the appropriate body parts or vice versa. Advantageously, the training method may be carried out either in the hospital or at home, with or without expert supervision; and it not only provides instant information relevant to the handling and care of the baby, but also gives the expectant parents "hands on" experience in actually handling a simulated newborn infant. A particularly advantageous feature of a preferred method is the step of viewing reference points which are printed on both doll and instructions so that the trainee may use them both in concert while practicing aspects of this invention. Another advantageous feature of a preferred method is the step of reading information written directly on the baby which deals with specific "crisis" situations.

Figure 1:
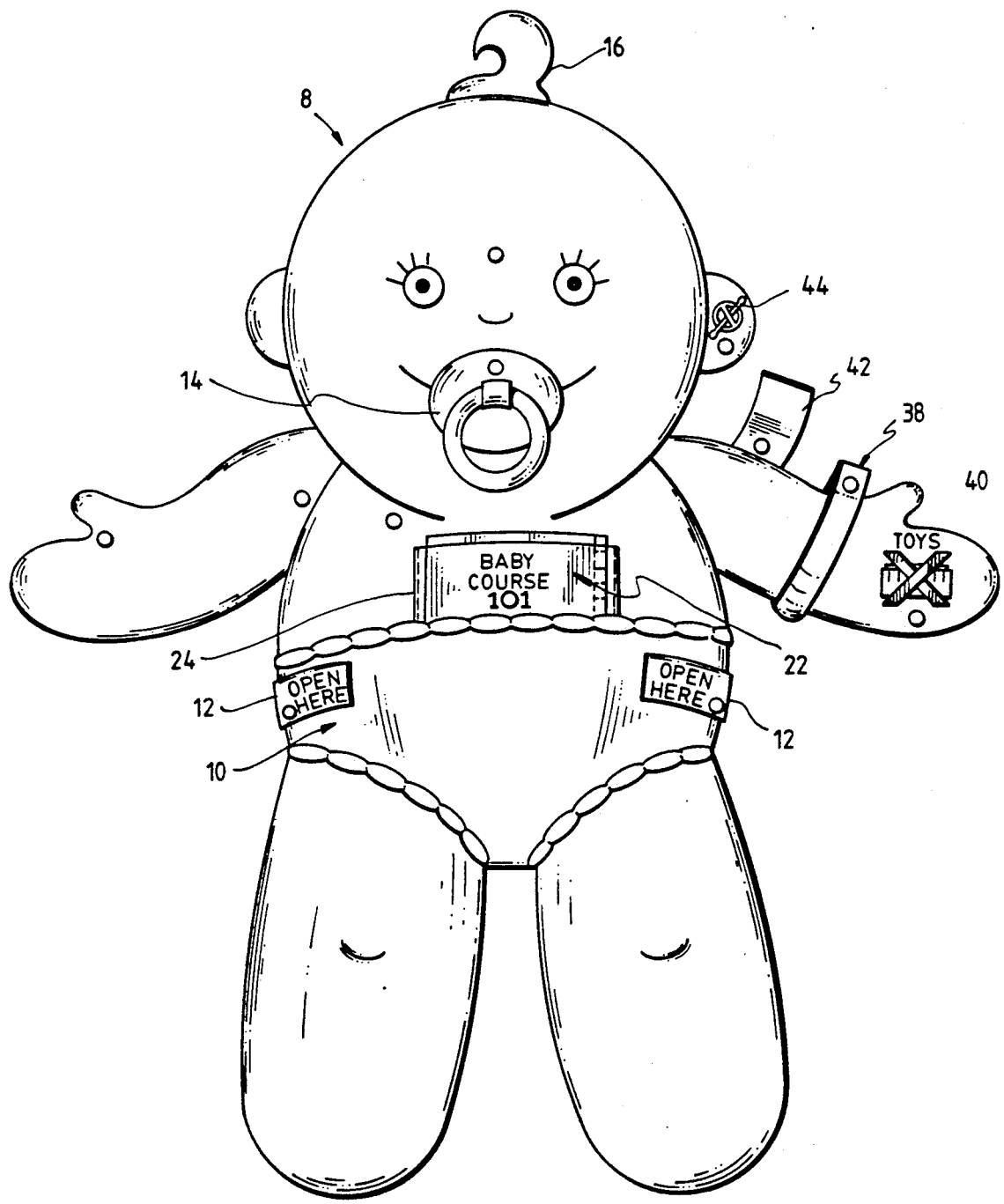
FIG. 1 is a front view of a preferred embodiment of the invention, a doll which includes various features discussed in greater detail herein.
Figure 2:
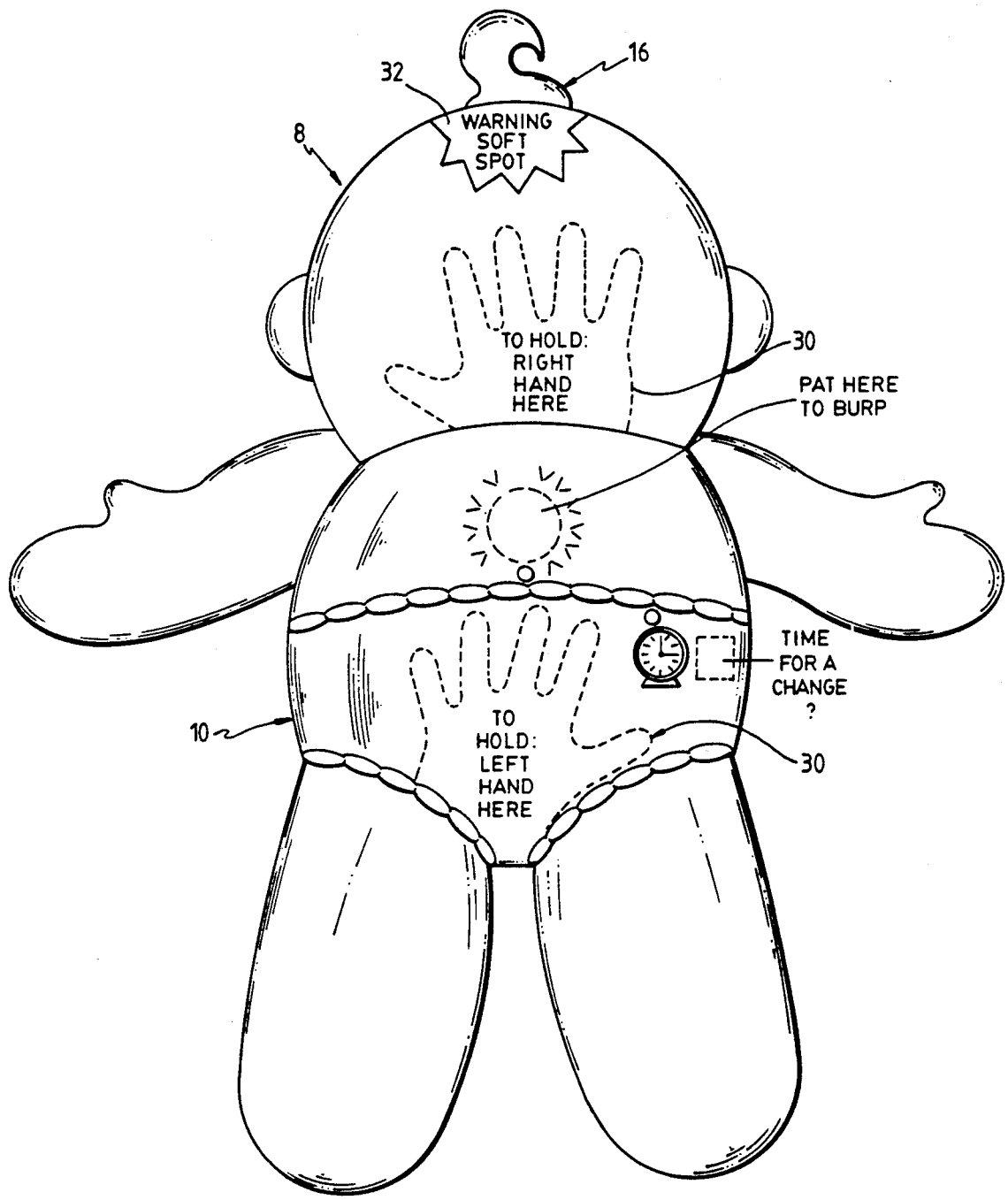
FIG. 2 is a rear view of the same doll shown in FIG. 1.
Figure 3:
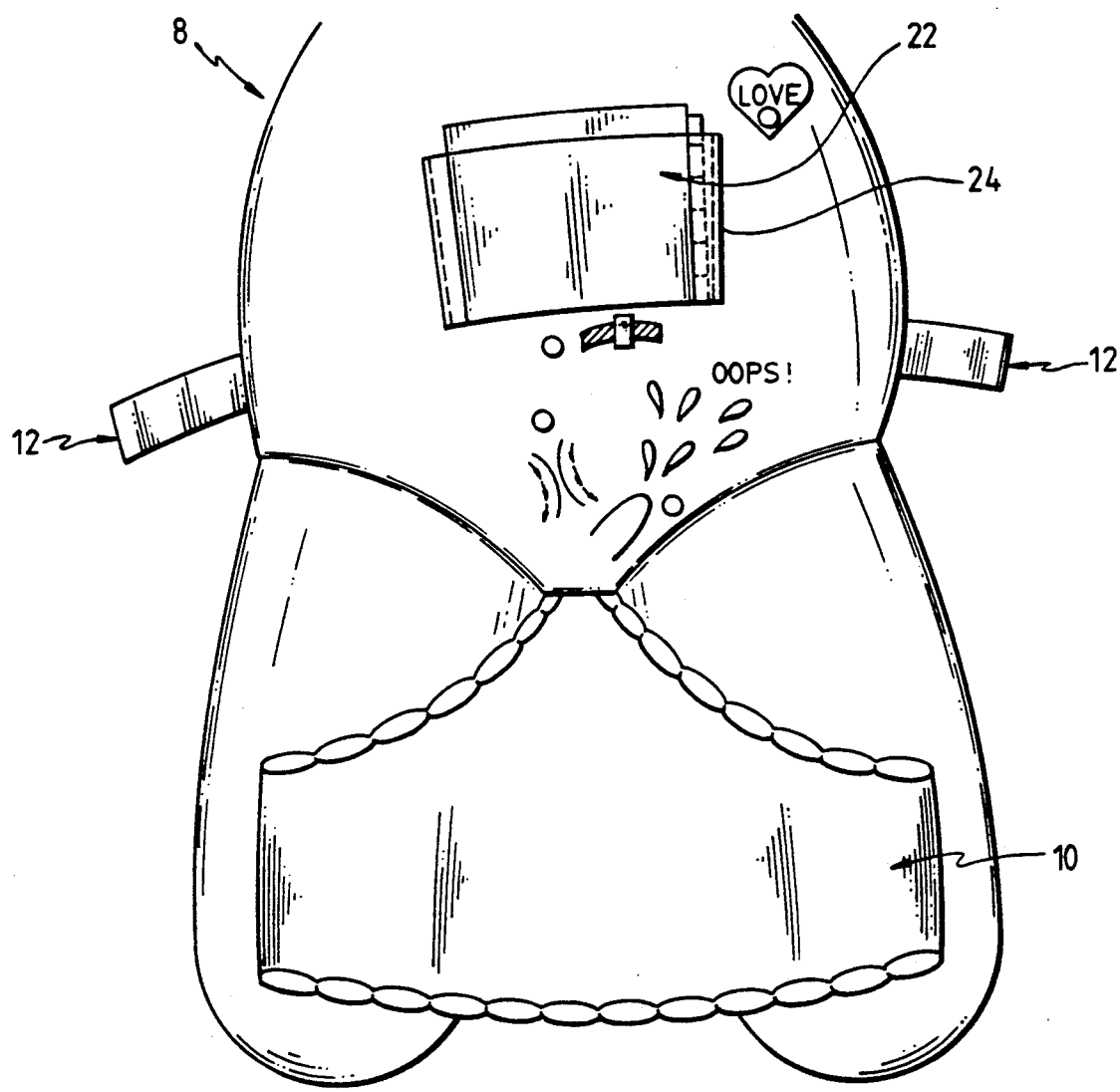
FIG. 3 is a front view of a portion of the doll, shown with the diaper in the open position.
Figure 5:
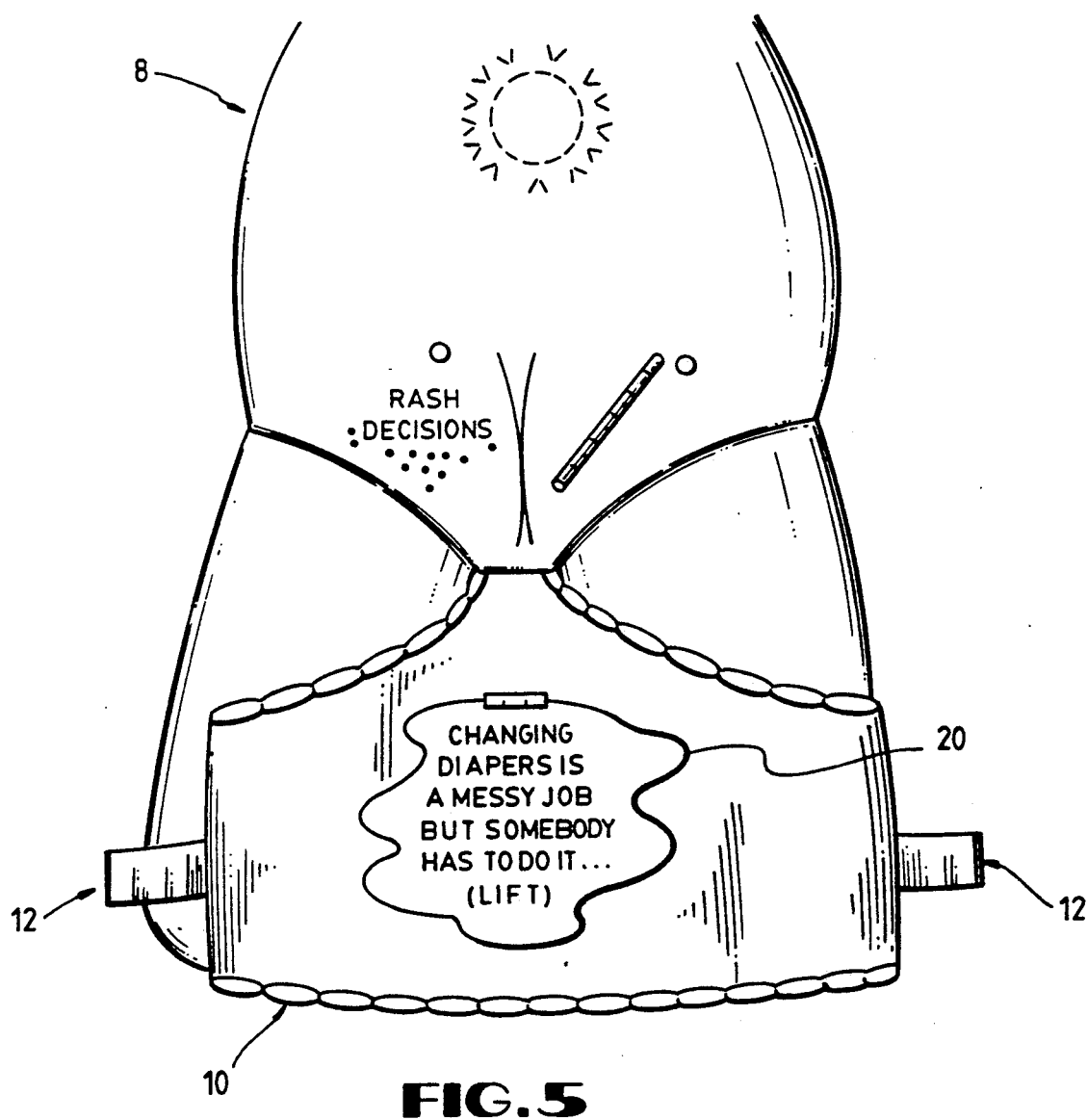
FIG. 5 is a rear view of a portion of the doll, shown with the diaper in the open position.

In preferred embodiment of the apparatus of this invention and referring specifically to FIG. 1, the doll 8 includes a diaper 10, which is permanently attached to the doll 8 at a point between the legs of the doll, and which may be oriented into either an "open" position or a "closed" position. The diaper 10 in FIGS. 1 and 2 is in the closed position, and has tabs 12 on either side with the instructions "open here" printed thereon. Referring to FIGS. 3 and 5, the diaper 10 may be converted to the open position by separating the Velcro tabs 12 located on either side of the diaper 10 and may be converted to the closed position by joining the Velcro tabs 12 in the same manner one would separate and join tabs of an actual diaper.

Another aspect of the doll which is part of a preferred embodiment is a retractable pacifier 14 which is connected to the mouth by a cord (not shown) which activates a motor or "voice box" (also not shown) inside the doll, so that the doll simulates a baby crying when the pacifier 14 is retracted. The educational purpose of this pacifier construction is to demonstrate the dilemma often faced by parents who must choose between leaving the pacifier in the mouth of their child and accepting the perceived problems associated with pacifiers, such as possible damage to the child's teeth; and removing the pacifier and suffering the cries of the child. The motor and cord are conventionally available devices familiar to those in the doll-making industry, their specific construction is beyond the scope of the invention.

Another aspect of the preferred embodiment is simulated hair 16, which is removable. One purpose of the removable hair is to demonstrate the tendency of a newborn baby's hair to fall out shortly after the child is born. Another purpose is to prepare the parents for a newborn with a head that is either bald or hairy-headed. The simulated hair may e made of yarn or any other material that is used to make hair in conventional dolls, and may be attached to the head by Velcro.

Figure 4:
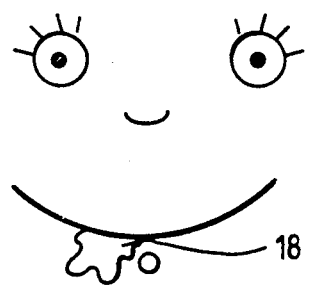
FIG. 4 is a front view of the face of the doll, shown without the pacifier.

Referring to FIG. 4, another aspect of a preferred embodiment of the invention is flat, irregularly shaped member 18 located next to the doll's mouth to simulate a baby's "spit up." This member 18 should also be removable and may be attached to the mouth by Velcro. The purpose of member 18 is to demonstrate the tendency of a baby to spit up its formula. A message may be printed on the face of the baby next to member 18 that says "Remove spit up and place on you" to prepare parents for the likelihood that the spit up eventually ends up on clothing of the parent.

Referring to FIG. 5, still another aspect includes a flat, irregularly shaped member 20 hingedly attached to the inside surface of the diaper 10 which may be lifted to reveal a simulated stain on the diaper 10 to demonstrate what happens when the baby has an "accident." The member 20 may be lifted up on its hinge to reveal a message such as "changing diapers is a messy job—but somebody has to do it . . . (lift)."

A preferred embodiment of the invention includes instructions which preferably comprise a small manual 22 having pages which include the same reference points, e.g., colored marks and/or numbers, as those which appear on the doll 8 itself. The reference points are represented in the figures a small circles, and in a preferred embodiment, are numbered and/or colored. Each page of the manual 22 contains instructions specifically pertinent to the body part having the same reference point, so that the directions or information relevant to the particular body part may be conveniently and immediately accessed by the trainee. A small manual 22 is preferred because it may be attached to the doll 8 by a cord or, as shown in the figures, by inserting the manual 22 in the pocket 24 wherein it may be removed at an appropriate time by the trainee. More broadly, the instructions may be embodied in other objects, such as a single sheet of paper, a complete book, an audio cassette, or even a videotape.

In a preferred aspect the instruction manual 22 of the invention is removably attached tot he doll 8. That is, the manual 22 is attached so that the instructions may accompany the doll whenever the doll is transported or stored, but may be removed at the convenience of the trainee. The manual is preferably removably attached to the doll by inserting it into a pocket 24 which should be made of clear vinyl or plastic which is affixed to the doll, e.g., by stitching the side and bottom edges of the pocket to the doll's tummy. Referring to the doll 8 shown in FIG. 1, the pocket 24 is attached at the front so that at least a portion of the manual 22 is visible and may be removed by the trainee without removing the diaper 10. A more complete view of the pocket 24 containing the manual 22 may be seen in FIG. 3, in which the diaper is in the "open" position.

In a specific embodiment of the invention, the instructions and information in the manual 22 are grouped into a number of categories, each category being given a color which corresponds with colors of the reference points 26 on the doll. Each color-coded category is further subdivided into specific topics, which contain instructions or information specifically directed to a particular body part on the doll, each topic pertaining to a reference point 26 on the doll, and which is given a number. Thus, there may be several numbered topics for a given color-coded category.

The color-coded categories may be chosen based on may criteria, for example, the category identified by the color yellow may signify the more critical topics relating to the health and safety of the baby, while the category identified by the color blue may signify the less critical topics relating to handling of the infant.

The topics are identified by number, which correspond to both numbers of the reference points on the baby and specific instructional information in the manual. The following instructional topics are purely exemplary of those which concern the care and handling of a newborn infant:

(1) physical appearance
(2) holding a newborn
(3) bonding
(3) feeding
(3) crying
(3) pacifiers
(4) burping
(5) eyesight
(6) diapering
(7) changing a boy
(7) circumcision
(8) changing a girl
(9) naming the baby
(10) bathing
(10) cutting fingernails
(11) umbilical cord
(12) soft spot
(13) sick baby
(13) taking the temperature
(13) calling the doctor
(13) exposing the baby
(14) cleaning the ears
(15) appropriate toys
(16) clothing
(17) interacting with the baby
(18) spoiling the baby In accordance with a preferred embodiment, the trainee may remove the manual 22 from the pocket 24 attached to the doll 8, refer to the body part of the doll 8 for which information is sought, open the manual 22 to the page(s) having the desired information or instructions relevant to the particular body part, and read the information or instructions from the page(s) of the manual 22. For example, referring to FIG. 3, the manual may include instructions on how to wipe the baby's organs after it has "wet." The reference number 7 (shown on FIG. 3 as a small circle) next to a picture of the male organ can be referenced in the manual to the specific page which provides instructions on how to wipe a little body's organ, while the same reference number 7 next to the female organ can be referenced in the manual to instructions on how to wipe a little girl's organ. As another example, and referring to FIG. 5, a reference number on the left buttock of the doll having the label "Rash Decisions" can be referenced in the manual under the appropriate topic for information on diaper rash and changing the baby's diapers. Thus, the in accordance with the invention, information relating to the care and handling of a newborn infant can be quickly and easily accessed by the parent. This quick access may be of particular importance after the child is born, when problems and emergencies arise, often at an alarming and inconvenient frequency, and when the parent often does not have the time or patience to go thumbing through a complete books to diagnose the problem and obtain the necessary information.

In a specific embodiment of the invention, in addition to the instructions which may be embodied in the manual 22, certain critical information may be printed on the doll itself. For example, referring to FIG. 2, the doll may include outlines of handprints 30 showing a correct placement of the hands while a parent is holding the baby, e.g., to properly support the head with one hand and the body with the other hand. Also referring to FIG. 2, the doll may include a warning label 32 on the top of the head where the soft spot of a newborn infant is located, as well as reference number 12 which can be used to reference additional information in the manual 22. A label 34 in the midpoint of the doll's back states where the baby is to be "burped," with additional information available in the manual 22 under reference number 4. A label 36 on the diaper 10 shows a picture of a clock along with the message "Time for a Change?"

Referring to FIG. 1, another feature of the invention (which is not shown in FIG. 2) is an i.d. bracelet 38, which comprises an erasable surface, on which the parent may write and erase prospective names for the baby while waiting for the baby to be born. An important safety feature printed directly on the doll is a picture of a ruler 40 showing the minimum size of an object that should be placed in a newborn infant's hand to guard against the baby swallowing objects. "Washing instructions" 42 are also attached to the doll, which provide instructions for the washing of a newborn infant, e.g., the maximum water temperature and bathing time. A label 44 on one of the ears communicates the message that q-tips and other sharp objects should not be used to clean a newborn infant's ears.

It is to be appreciated that, although the foregoing disclosure discusses various embodiments and variations of the invention, such embodiments and variations are not to be limiting to the scope of the invention, which is defined by the claims, below. For example, although a human infant is shown and described in the figures, a non-human figure such as a bear or chimpanzee may also be used. Also, the reference points do not necessarily have to be numbered or colored. Furthermore, although a manual is specifically discussed, there are various ways of embodying the instructions. A videocassette may be provided which refers audibly and/or visually to reference points on the doll and which provides instructions and information relating to the reference points.

What is claimed is:

1. A method of training persons in the care and handling of a newborn infant, comprising the steps of:
   providing a doll in which the doll comprises a torso, with head, arms and legs attached to said torso;
   providing a plurality of reference points printed on the surface of the doll at different locations, said reference points being visually identifiable by a trainee; and
   providing instructions which relate to the care or handling of a newborn infant, said instructions including the same reference points which are printed on the surface of the doll.

2. The method recited in claim 1 wherein said step of providing reference points includes providing colored markings on the doll; wherein the reference points on the doll are visually identified by viewing the colors of the reference points on the doll; and wherein said step of providing instructions includes providing a specific set of instructions identified by viewing the colors, said colors being a part of said instructions.

3. The method recited in claim 1 wherein said step of providing reference points includes providing numbered markings on the doll; wherein the reference points on the doll are visually identified by viewing the numbered markings of said doll; and wherein said step of providing instructions includes providing a specific set of instructions identified by viewing the numbered markings, said numbered markings being a part of said instructions.

4. The method recited in claim 1 wherein said step of providing instructions comprises providing a manual which includes pages, said pages having information related to the care of an infant, said pages also having reference points related to the reference points printed on the surface of the doll.

5. The method recited in claim 1 wherein said step of providing instructions comprises attaching a manual to said doll, said manual being capable of being removed by the trainee.

6. The method recited in claim 1, additionally comprising providing a diaper attached to said doll, said diaper capable of being in an open position or a closed position.

7. The method recited in claim 6, additionally comprising providing a flat, irregularly-shaped member which is hingedly attached to the diaper, and a message printed on said diaper which is revealed by the lifting up of the regularly-shaped member.

8. The method recited in claim 1, additionally comprising providing a pacifier, said pacifier being connected to the head of said doll at the mouth by a retractable cord which is attached to means for activating a sound simulating the crying of a baby.

9. The method recited in claim 1, additionally comprising providing a piece of simulated hair which is removably attached to the top of the doll's head.

10. The method recited in claim 1, additionally comprising providing an irregularly-shaped member removably attached to the mouth of the doll.

11. A method of training oneself in the care and handling of a newborn infant, comprising the steps of:
holding a doll which simulates an actual newborn infant in which the doll has a plurality of reference points printed on different parts of the doll's body, wherein the reference points are visually identifiable by the trainee;
visually identifying at least one of the plurality of reference points printed on the doll; and
viewing instructions which comprise information keyed to the reference points printed on the doll, wherein the information is divided into topics that specifically relate to the care of a newborn infant, the handling of the infant, or the specific body part identified by the reference point.

12. The method recited in claim 11, wherein said instructions comprise a manual which is removably attached to the doll, said method additionally comprising the step of removing the manual from the doll and reading said instructions which comprise information keyed to the reference points printed on the doll.

* * * * *